US009456557B2

(12) United States Patent
Meyer-Oeste

(10) Patent No.: US 9,456,557 B2
(45) Date of Patent: Oct. 4, 2016

(54) METHOD FOR COOLING THE TROPOSPHERE

(75) Inventor: Franz-Dietrich Meyer-Oeste, Kirchhain (DE)

(73) Assignees: Ernst Ries, Hosenfeld-Gersrod (DE); Franz-Dietrich Meyer-Oeste, Kirchhain (DE)

(*) Notice: Subject to any disclaimer, the term of this patent is extended or adjusted under 35 U.S.C. 154(b) by 890 days.

(21) Appl. No.: 13/143,112

(22) PCT Filed: Jan. 4, 2010

(86) PCT No.: PCT/DE2010/000002
§ 371 (c)(1),
(2), (4) Date: Aug. 4, 2011

(87) PCT Pub. No.: WO2010/075856
PCT Pub. Date: Jul. 8, 2010

(65) Prior Publication Data
US 2011/0284650 A1    Nov. 24, 2011

(30) Foreign Application Priority Data

| Jan. 2, 2009 | (DE) | 10 2009 004 081 |
| Jan. 29, 2009 | (DE) | 10 2009 006 603 |
| Dec. 9, 2009 | (DE) | 10 2009 057 369 |
| Dec. 17, 2009 | (DE) | 10 2009 059 005 |

(51) Int. Cl.
*A01G 15/00* (2006.01)
*E01H 13/00* (2006.01)

(52) U.S. Cl.
CPC .................... *A01G 15/00* (2013.01)

(58) Field of Classification Search
CPC ....... B05B 7/10; B05B 7/0408; B05B 15/06; F23D 11/10; F23D 11/102; B01F 5/0057; F16M 13/00; A01G 15/00; A01G 13/065; E01H 13/00; C06D 3/00; E01C 11/26
USPC .......................... 239/3.1, 3, 8, 9, 10, 11, 13
See application file for complete search history.

(56) References Cited

U.S. PATENT DOCUMENTS 4,098,738 A * 7/1978 Buerkley et al. ............. 503/201
5,376,346 A * 12/1994 Powers ..................... 423/239.1

(Continued)

FOREIGN PATENT DOCUMENTS

| DE | 10 2009 004 281 A | 7/2009 |
| WO | WO 03/013698 A2 | 2/2003 |
| WO | WO 2008/006364 A2 | 1/2008 |

OTHER PUBLICATIONS

International Search Report dated Jul. 7, 2010 including English-language translation (Six (6) pages).

*Primary Examiner* — Arthur O Hall
*Assistant Examiner* — Chee-Chong Lee
(74) *Attorney, Agent, or Firm* — Crowell & Moring LLP

(57) ABSTRACT

Self-initiated cooling of the troposphere occurs by enriching the same with at least one substance from the group of inorganic chloride and bromide compounds. The substances used to this end are characterized by at least one of the properties: gaseous, vaporous below 500° C., hygroscopic, hydrolysable. The formation of the substances used to this end is further characterized in the process in accordance with the invention by at least one of the steps: forming the substance using salt water electrolysis, forming the substance outside of combustion processes, forming the substance in the free troposphere.

14 Claims, 1 Drawing Sheet

(56) References Cited

U.S. PATENT DOCUMENTS 5,912,396 A 6/1999 Wong
7,501,103 B2 3/2009 Oeste
2005/0106061 A1* 5/2005 Oeste .................... 422/4
2007/0152200 A1* 7/2007 Hedrick et al. ............ 252/601
2007/0215489 A1* 9/2007 Omasa ..................... 205/742
2008/0257977 A1 10/2008 Chan et al.

* cited by examiner

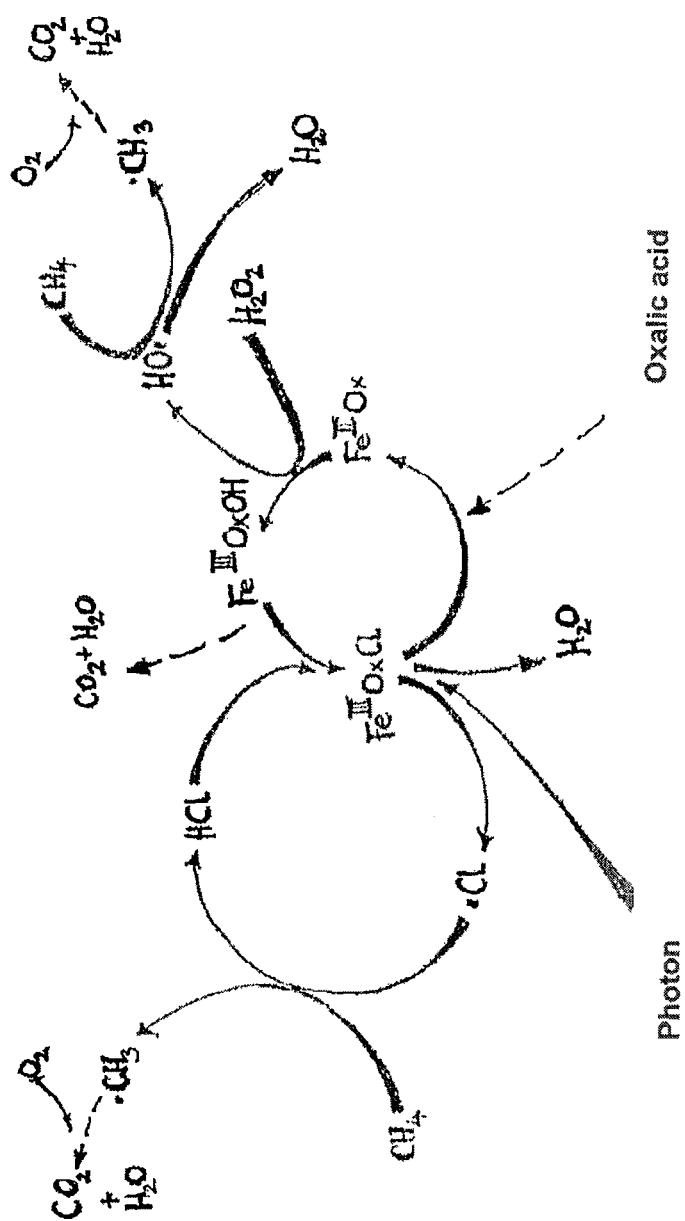

METHOD FOR COOLING THE TROPOSPHERE

A technical process is claimed for the self-initiated cooling of the troposphere by enrichment with halogen-containing hygroscopic aerosols. The process is based on the addition of at least one gaseous or vaporous substance selected from the group of the inorganic chlorine and bromine compounds to the troposphere.

For the self-initiated decomposition of the greenhouse gases carbon dioxide and methane in the troposphere, and for the formation of reflecting clouds for the purpose of cooling the climate, it was suggested in the published PCT applications with the International Publication No.: WO 03/013698 A2, WO 2008/006364, and in the German published Application DE 10 2009 004 281 A1 to modify the smoke gases from combustion processes in motors or oil burners by using fuel additives or additives to the combustion so that they become enriched with substances from the group of the so called protective substances and vital elements, especially from the group of the iron oxides and/or titanium oxides and possibly additionally with one of the substances sulphate, chloride and silicon dioxide. The exhaust gases enriched with these compounds are then to be emitted into the troposphere with the goal to enrich individual volume elements of the troposphere with those compounds.

It has been suggested from the scientific side to initiate the formation of reflecting and thereby cooling clouds by ocean water nebulisation for the cooling of the climate and the strengthening of the global reflection. Sea salt aerosols are formed by the sea water nebulisation which act as cloud condensation seeds. Although sea salt aerosols can initiate cloud formation in the atmosphere, the induced clouds are however not of the cloud type with high reflection and are therefore of low effectiveness.

The known processes for the production of simple salt aerosols which are composed of small aerosol particles can be produced by mechanical injection processes, for example by spraying by way of nozzles or by ultrasound vibration. However, this aerosol type cannot be readily used for the production of salt aerosols of hygroscopic salts, since the aerosol particles formed thereby are unsuited for the intended application: the majority of the thereby formed aerosol particles consist of course particles or droplets which settle at an accelerated rate.

The process in accordance with the invention solves the climate problem by the use of inorganic halogen containing substances. A technical path and comprehensive technical teaching is disclosed on how the troposphere can be enriched with climate cooling halogenides, which are produced without combustion.

According to the process of the invention, gas streams, optionally warm or cold gas streams, are loaded with gaseous or vaporous inorganic halogen-containing substances. The now halogenated gas streams are subsequently emitted into the troposphere. The gas in which the aerosols according to the process of the invention are formed or into which the aerosols according to the inventive process are added is herein referred to as carrier gas. Here, a carrier gas is also generally understood to include the air passing by a vehicle during the trip on land, on water or in the air. This also applies for the exhaust gases which flow through such a vehicle or which exit such a vehicle. The wind or a smoke gas, exhaust gas or exhaust air can also act as carrier gas when the process is carried out at a fixed location. Examples therefor are exhaust gases from smokestacks and chimneys and the exhaust air from cooling towers.

The halogen-containing substances added to the carrier gases are characterized by at least one of the following properties and relate exclusively to the halogenated compounds of the group chlorine and bromine:

- gaseous at 20° C.,
- vaporous below 500° C.,
- measurable vapour pressure above 50° C.

In addition, the halogen-containing compounds have at least one of the properties:

- hygroscopic,
- formation of hygroscopic or hydrolyzable reaction products with naturally occurring or artificial atmospheric constituents.

In addition, the formation and liberation of the halogen-containing substances used in the process flow in accordance with the invention is characterized by the feature that the halogen-containing compounds are not produced in a combustion facility in which oxygen or oxygen carriers or halogenated hydrocarbons are used as oxidating agents.

In addition, the process flow is characterized by at least one of the steps:

- liberation of the halogen-containing substances into the troposphere by use of salt water electrolysis,
- liberation of the halogen-containing substances into the troposphere by use of at least one reaction of the group of the reactions of metallic iron and its alloys with halogens, of elementary silicon and its alloys with halogens and of metallic titanium and its alloys with halogens,
- liberation of the halogen-containing substances into the troposphere by use of a carrier gas,
- formation of the halogen-containing substances in the free troposphere.

BRIEF DESCRIPTION OF THE DRAWING

The single FIGURE is a schematic perspective drawing of an illustrative methane oxidation in the troposphere according to the schematic formula of the present invention.

Our research has shown that apart from the element iron the elements chlorine and bromine in a suitable compound or composition are the most effective elements in the natural climate cooling because of their physical, photochemical, catalytic and biological mechanisms of action: iron in the form of iron salts in connection with chlorine in the form of chlorides liberates chlorine radicals and hydroxyl radicals by way of the Photo-Fenton-Process in the sunlight of the troposphere, which radicals among other things initiate the methane oxidation in the troposphere according to the schematic formula of the single FIGURE. Iron generates by way of the photo oxidation of chloride and bromide an elevated chlorine radical, bromine radical and hydroxyl radical level in the troposphere. Chlorine, bromine and bromine chloride, but also the sulphur halogen compounds on their own on illumination release halogen radicals into the troposphere. These radicals lower the level of the greenhouse active substances methane and ozone, as well as one of the dark carbon aerosols of the type of the soots and humic substance-like materials, especially by way of hydrogen abstraction. The hydrogen abstraction is an initiation reaction which initiates the degradation by oxygen attack and hydrolysis.

Carbon in the form of oxalate and on a smaller scale in the form of other carboxylates, activates these processes. Apart from iron, silicon assists the propagation and thereby the assimilation of green plankton.

The hygroscopic iron(III)salt aerosols increase by way of the elevated condensation seed density the cloud formation rate, the specific cloud reflection, and the cloud cover and thereby trigger additional cooling effects because of their increased reflection. The retardation of the droplet coagulation caused by the iron aerosols activates the vertical flows in the clouds and thereby stimulates the ice crystal formation. The ice formation in the clouds leads to freeze concentration of the liquid cover made of an iron halogenide solution which extends over the surface of the snow crystals. The freeze concentration of the iron halogenide solution initiates the additional activation of the cooling active photo-oxidation processes.

Finally, the precipitation from the aerosols of soluble iron salts and oxidatively bound silicon, as growth stimulating scarce elements, stimulates diatom blooms in oceans, which elevates the assimilative carbon dioxide transformation into organic carbon mass and the metabolic carbon dioxide transformation into carbonate carbon mass with the additional formation of animal, plant, and bacterial shell, skeleton, and scaffold substances made of calcite and aragonite. Thereby after sedimentation on the ocean floor, the formation rate of permanently sediment-bound carbon in the form of limestone, methane hydrate and kerogen also increases.

Apart from the element iron (Fe) and the elements chlorine (Cl) and bromine (Br), the elements carbon (C) and silicon (Si) are therefore in the following also referred to as active elements, since in an effective compound or composition they especially contribute to the climate cooling.

For the process in accordance with the invention which is described in the main claim, those active elements are used as substances which have the following physical properties: they are gaseous or have a boiling point under 500° C. or have below 500° C. and above 40° C. at least a measurable vapour pressure. The compounds of the active elements preferred therefore are compounds of the group: $FeCl_3$, $FeCl_3 \times 6\ H_2O$, $FeBr_3$, $FeBr_3 \times 6\ H_2O$, $SiCl_4$, $SiBr_4$, $Br_2$, $Cl_2$, $BrCl\ S_2Cl_2$, $SCl_2$, $S_2Br_2$, $SBr_2$, $HBr$, $HCl$, $NH_4Cl$, $NH_4Br$, sea salt, oxalylchloride, oxalylbromide, oxalic acid, formylchloride, formic acid, ammonium oxalate, ammonium formate. Optionally, volatile acids and bases or volatile base and acid precursors, such as for example $NH_3$, and their aqueous solutions, $(NH_4)_2CO_3$ and $SO_2$ are used for the pH value conditioning of the active element-containing aerosols.

At least one bound active element is thereby in one or more state of steam, melt, solution, dispersion, fog, melt on solid carriers and/or solid on solid carriers and at a temperature of preferably under 500° C. brought in contact with a carrier gas in such a way that the active element forms with the carrier gas an active element-containing gas mixture. In all the cases in which the active element iron is added to the carrier gas as an iron(III)halogenide steam, a contact temperature is preferably selected at which the concentration of the iron as $FeCl_3$ steam in a dry gas is at least $10^{-4}$ weight percent iron per weight percent carrier gas. Contact temperature is meant to indicate the temperature present at the location at which the carrier gas is brought into contact with the iron(III)chloride.

Warm or hot carrier gases are only then necessary when the heat content of the carrier gas is to be used for the evaporation of active element compounds.

When the active element compounds are added to the carrier gas right from the start as a gas, cold carrier gases can also be used.

The concentration of the individual active elements in the carrier gas is preferably controlled by their addition to the carrier gas. Preferably, the carrier gas is enriched with all active elements at the predetermined concentration. The carrier gas enriched with the active elements is then emitted into the troposphere. By way of one or more of the processes of cooling, hydrolysis, or chemical reaction of at least one active element compound, the active elements can, already in the carrier gas, or upon their emission into the troposphere, or only within the atmosphere, transfer from the gas phase into an aerosol phase the particles or droplets of which can be composed of one or more phases. The latter can consist of a hydrolyzed liquid phase, a solid to liquid salt-type phase, or a liquid salt solution phase.

A smoke gas or other gas stream is used as the carrier gas. The process in accordance with the invention is furthermore characterized in that the aerosol emission into the troposphere occurs from at least one location, but preferably from several stationary and/or several moving locations. The permanently active element-containing gases, such as for example elementary chlorine, hydrogen bromide, or hydrogen chloride are also preferably added to a carrier gas stream before they are added to the troposphere.

The mass of the active element-containing compound and/or the concentration of the active element-containing compound in the emitted carrier gas per unit time is preferably metered in accordance with the process of the invention in such a way that the possibly existing legal emission regulations of a country, region and/or location are not violated. Under this stipulation, the concentration of the active element-containing aerosol is preferably measured such that the chosen ratio of the emitted active element mass to the emitted carrier mass is at least $10^{-6}$, by preferably exceeds $10^{-5}$. The concentration of the active element emission in remote areas can upon suitable stormy weather conditions definitely reach the ratio of the emitted active element mass to the emitted carrier mass of $10^{\circ}$, but should preferably not exceed it. The preferred ratio of emitted active element mass to emitted carrier gas mass lies in the range of $10^{-5}$ and $10^{-3}$.

In the case that the halogen-containing aerosols according to the process in accordance with the invention are formed in the carrier gas or are to be generated at least immediately after introduction of the carrier gas into the troposphere, the mass ratio of the active elements in the carrier gas should preferably lie within predetermined limits: the portion of the element bromine should be less than 1% of the chlorine content in the carrier gas. The chlorine content should be larger than the iron content in the carrier gas. The carbon content in the form of oxalate and formate is smaller than the iron content. In the case where a silicon additive is chosen, the silicon content should be the same as or larger than the iron content.

One can deviate completely from these mass ratios at the locations of the carrier gas introduction into the troposphere, when the formation of the halogen-containing salt aerosols takes place remote from the locations of the introduction of the halogen components or the iron components or of other relevant components. Since the retardation of the halogen loss by washing-out of the halogens from the troposphere by the iron halogenide-containing aerosols is incomplete, the halogenide content of the iron-containing aerosols continuously decreases. Equally, the oxalate carbon content is reduced by oxidation losses and the iron or silicon content is also reduced by wash-out losses.

It is therefore an important aspect of the process of the invention, for the maintenance of the optimum aerosol content and the optimum composition of the tropospheric aerosol, especially for the maintenance of its iron, halogen, and oxalate content, a) to determine the content and composition of the aerosol by using the network of globally distributed aerosol measurement stations and also, for example, satellite-based analytic processes in order to determine the difference to the predetermined target composition;

b) to carry out a suitable introduction of the missing components of the gaseous, vaporous, or aerosolic additives into the troposphere according to the difference to the predetermined target composition.

The residence time of fine particle aerosols in the troposphere is months to years. Therefore, the troposphere can be considered to be a more or less mixed uniform chemical-physical reaction space.

The introduction of the additives into the troposphere can therefore be carried out from any location. This, as well as the introduction of the halogen-containing aerosols, preferably occurs by way of carrier gases. Preferred for the compensation of halogen losses from the tropospheric aerosols are the gaseous and vaporous halogen-containing compounds, for example, chlorine, bromine, bromine chloride, chlorine oxide, bromine oxide. Preferred for the compensation of iron losses from the tropospheric aerosols are iron (III)chloride as vapour and as aerosol solutions of iron(III) chloride as well as other iron salts as well as precipitated suspensions of iron(III)oxide hydrate and iron(II)sulphide. Preferred for the compensation of oxalate losses from the tropospheric aerosols are the vaporous halogen-containing compounds such as oxalylchloride, oxalic acid, ammonium oxalate. Preferred for the compensation of silicon losses from the tropospheric aerosols are the vaporous halogen-containing compounds such as silicon tetrachloride and silicon tetrabromide.

According to our own research, the particle diameter of the aerosol particles, which were produced according to a variant of the process in accordance with the invention, which is described in the main claim, lies well below 1 micrometer in air at a relative humidity below 30%. At this particle size, the aerosols have a maximum residence time in the atmosphere which can be more than a year. When the pH value of the halogen-, iron-, and oxalate-containing aerosol particles in contact with water is below pH 4.5 and above pH 0, the aerosol has a maximum effect as condensation seed for the tropospheric water vapour. Within this pH range, between about pH 4.5 and about pH 2.5, is also the optimum of the chlorine radical formation and the hydroxyl radical formation in the Photo-Fenton-Reaction Cycle which is illustrated in the schematic formula according to the single FIGURE.

The addition of the active elements into the carrier gas with which these enter into the troposphere occurs according to the preferred variant of the process in accordance with the invention which is described in the main claim in the following manner:

The most effective and therefore preferred variant of the manufacture in accordance with the invention of the active element-containing fine particle aerosols is the introduction of active element compounds into the carrier gas in such a way that it is initially added in a completely vaporous physical condition into the carrier gas or is introduced as a gas into the carrier gas. In this manner, all active elements can be introduced into the carrier gas: iron preferably as $FeCl_3$, silicon preferably as $SiCl_4$, chlorine preferably as $FeCl_3$, $Cl_2$, BrCl, or $SiCl_4$, bromine preferably as $SiBr_4$, $Br_2$, BrCl, and carbon preferably as oxalylchoride, oxalic acid or ammonium oxalate.

The introduction of the active elements chlorine and bromine can also take place in the form of the hydrogen halides or in the form of other inorganic volatile compounds such as in the form of sulphur halogenides. The introduction of the active element compound into the carrier gas occurs preferably by way of controlled transfer of the active element compound into the gas phase and liberation of the formed active element gas phase into the carrier gas. The active element compounds which are respectively provided in storage containers as liquids, solutions, melts, or solids can be evaporated, for example by way of electric heating elements or inductively at a respectively controlled mass per unit time, and the resulting active element vapour can thereafter be introduced into the carrier air stream. Especially preferred is the electrolysis of salt solutions as a means for the generation of the gaseous elementary halogens and the bromine chloride.

Another preferred method of contact of the active element compounds with the carrier gas is the wick method. It can be used when hot carrier gas, for example exhaust gas from a combustion process, is available. For this purpose, a cord acting as a wick is guided through the active element compounds respectively present in storage containers as liquids or melts, whereby the cord then wicks with the respective liquid and subsequently is brought into contact with the carrier gas in such a way that the active compound adhered thereto completely evaporate. A further preferred possibility is the respective conduction of a respectively measured gas stream through the storage containers in which the active element compounds present as liquids, solutions, melts, or heated solids are found. The metered gas streams thereby saturate with the respective active element composition at a predetermined temperature and are thereafter introduced into the carrier gas stream. For example, oxalic acid can also be applied to the wick as a solution in formic acid and/or in water.

It must be taken into consideration that the preferred active element compounds $FeCl_3$, $SiCl_4$, $SiBr_4$, oxalylchloride, oxalic acid, aqueous oxalic acid solution and formic acid are highly corrosive liquids especially at high temperatures. Suitable materials for contact with the hot active element compounds are, for example, ceramics, glass, enamel or special steels, suitable as wick materials are, for example, glass or ceramic fibres. Apart from the mentioned materials, corrosion-resistant plastics are suitable, at a correspondingly lower temperature load, for example, polyolefins, polyvinylchloride and Teflon.

At the latest after the entry of the carrier gas stream into the atmosphere in which it possibly cools, the $FeCl_3$, $SiCl_4$, and $SiBr_4$ hydrolyze by forming $FeCl_3 \times 6\ H_2O$, $Si(OH)_4$, HCl and HBr. The especially preferred pH value of the aerosol in the slightly acidic range between pH 2 and pH 4.5 can be adjusted, if required, by the addition of gaseous ammonia.

The halogens added as elements are subjected only after their entry into the troposphere to the photolytic splitting into radicals. They are thereafter reduced by the reducing atmospheric components to hydrogen halides and thereafter again oxidized by the iron salt-containing aerosols to halogen radicals.

For replacement of the halogenide loss by the photolytic halogen radical splitting from the halogenide-containing iron salts, it is advantageous to enrich the troposphere with halogens in order to equilibrate the halogen loss of the iron salt aerosols. This is most advantageously achieved by the addition of gaseous halogens. Preferred for this purpose is especially the electrolysis of sea water. The sea water electrolysis can be carried out especially energy efficient and advantageous for the climate: products a) to c) are created during the sea water electrolysis.

Product a) consists of chlorine, bromine and bromine chloride in the form of a gas-vapour-mixture which is discharged by way of a suitable carrier gas stream into the troposphere in order to balance the halogen loss of the iron salt aerosols. Primarily, the halogens react under the influence of sunlight in the troposphere with the methane under the formation of hydrogen halide and carbon dioxide. The hydrogen halide formed then forms with the iron content of the aerosols iron halide salts.

Product b) consists of lye which contains alkali-metal hydroxides and alkali-metal carbonates in the form of a liquid aqueous solution. This solution is preferably introduced into the ocean and there the carbonic acid which is present in excess in the sea water precipitates as alkaline earth carbonates. The precipitated alkaline earth carbonates sink to the ocean floor and remain there as lime and dolomite sediment.

Product c) consists of gaseous hydrogen. The hydrogen is preferably introduced into a fuel cell. It is converted there with oxygen or air to water under the generation of electric power. The electric power can be transferred to the electric energy market or again used for sea water electrolysis.

Electrolytically produced hydrogen can also be burned for heat generation. The produced heat can be used for the pre-warming of the reactors in which the halogen compounds added in vapour form to the carrier gas stream are manufactured from the electrolytically produced halogen in accordance with the process of the invention. They are preferably the halogen compounds iron(III)halogenide, silicon tetrahalogenide, and sulphur halogenide. For the manufacture of the respective educt, preferably at least one unitary solid educt selected from the group of iron scrap, titanium scrap, sulphur iron, iron silicate, titanium silicate, silicon, is preheated either each individually or several in combination and in a reactor to a temperature of preferably 400 to 650° C. and thereafter the electrolytically produced chlorine gas is passed in this temperature range through the respective reactor. The named halogenides are thereby formed in an exothermic reaction as vapour which can be added directly to the carrier gas according to the process of the invention. Preferably, the chlorine gas introduction is dosed in such a way that the produced halogenide vapour still includes a portion of unconverted chlorine gas. An elemental sulphur melt into which chlorine gas is introduced is here also suitable as starting material for the manufacture of sulphur halogenide vapour.

The less preferred mechanical production of the active element-containing aerosols in the carrier gas is that variant of the process of the invention in which the conversion of the halogen-containing compounds into the gas phase is incomplete or does not occur at all or in which those unevaporated iron compounds are converted into the aerosol form which only in the free troposphere are to be converted into halogen salts. This variant shall nevertheless be described here, since it is suitable for the introduction of industrial by-products such as precipitated fine particle iron oxide hydrate sludges from pickling plants or water treatment plants as well as hydrogen sulphide precipitated as iron sulphide sludge from gas desulphurization and salts and salt solutions of the divalent iron from iron pickling and from the production of titanium dioxide to an advantageous use within the framework of the process of the invention.

The aerosol formation occurs hereby by intensive nebulisation of an aqueous solution or aqueous dispersion preferably containing below 20 weight percent single vapour residue into the carrier gas. The active element iron is thereby present in one or more of the states dissolved iron(III)chloride, dissolved iron(III)bromide, dissolved iron(II)chloride, dissolved iron(II)bromide, iron(II)sulphate, iron(II)ammonium sulphate, suspended iron(III)oxide hydrate, suspended iron(II)sulphide.

In and of themselves known processes for the mechanical formation of aerosols such as the known processes of the compressed air nebulisation, single compound-pressurized nozzle-atomization, dual substance-nozzle-atomization, airbrush-atomization, mechanical atomization, rotating disk-atomization, nozzle atomization or nebulisation by way of vibrators which vibrate in the ultrasound frequency range can be used here. The preferred vaporization residue concentrations in the salt solution to be atomized are between 0.01 and 20%. Especially suitable are vaporization residue concentrations in the liquid to be atomized between 0.5% and 10%. Where it is possible through suitable processes to produce especially fine atomization droplets, for example by ultrasound nebulisation or by the use of gases flowing at especially high relative speeds in the use of dual of substance nozzles according to the jet pump principal, in the way they are used as transport gases, for example in the waste gas jet of jet engines, sufficiently small particles even with vaporization residue concentrations in the liquids to be atomized of up to 20% can be achieved.

Finally, it is also possible to carry out combinations of the process variants in which the carrier gas is enriched with aqueous aerosols as well as with reactive gas or vapour.

Suitable for the process in accordance with the invention are also carrier gases which are already enriched with salt aerosols, halogens, hydrogen halides, or also iron chalcogenide aerosols. Thus, for example, a salt aerosol-containing carrier gas stream which was produced by the nebulisation of sea water as halogen source, can in accordance with the invention be enriched with aerosol which comprises at least one of the components iron salt, iron sulphide, iron oxide hydrate, and silicic acid. For carrier gases which are already enriched with halogen-free iron-containing salt or chalcogenide aerosols one or more of the gaseous hydrogen halide additives from the group of $Cl_2$, $Br_2$, $BrCl$, $HCl$, $HBr$, $SiCl_4$, $SiBr_4$, oxalylchloride, oxalic acid, and formic acid are suitable, since their acidic hydrolysis products and/or oxidation potential are suitable for converting the halogenide-free aerosols at least partially into iron chloride salts.

It is a special advantage of the new process that reflective clouds can be formed and the photolytic decomposition of the greenhouse gases methane and ozone can be commenced immediately after entry into the troposphere of the halogen, halogenide, and/or iron salt-containing gas, steam, and/or aerosol emission.

Oxalic acid and its salts occur in the atmosphere as natural oxidation products of organic emissions in an elevated concentration compared to the remaining organic substances so that it is not absolutely necessary to add the substances to the aerosols generated in accordance with the invention. However, the addition of oxalic acid acts beneficially on the desired radical formation. In addition, the elevation of the chloride and bromide level in the troposphere results in that an elevated portion of iron salt aerosols is present as halogenide salts. Chloride provides a protection against the oxalate oxidation in the Photo-Fenton-Oxidation Cycle, since the electron transfer from chlorides to iron in the Photo-Fenton-Oxidation Cycle is preferred over the electron transfer from oxalate to iron (schematic formula according to the single FIGURE).

The carrier gas stream with which the iron salt-containing aerosol is emitted is preferably an air stream or a waste gas stream which preferably is blown in predominantly vertical directions into the atmosphere from the ground, from towers, from ships, or from floating platforms, when it is a warm or hot waste gas stream. Preferably, the iron-containing salt aerosol is also blown or emitted into the troposphere from airplanes, hot air balloons, or thermal airships with the exhaust gas. Preferred emitters are also wind turbines, especially the ends of their blades when the wind is blowing. By way of a suitable control, the process in accordance with the invention is only activated when the wind speed has reached a minimum value of 20 km/h and possibly when the wind direction has a suitable value depending on the location. The dosing of the aerosol amount or the aerosol precursor amount is at such locations preferably selected dependent on the wind speed.

Especially suitable iron salts contained in solutions from which salt aerosols can be produced by the mechanical method are oxalates, chlorides, bromides, nitrates, sulphates, rhodanides, ammonium sulphates of the trivalent and/or divalent iron.

Especially suitable chloride salts which are contained in solutions from which salt aerosols can be produced by the mechanical method are the chlorides of iron, sodium, ammonium, calcium, and magnesium.

Especially suitable bromide salts which are contained in solutions from which the salt aerosols can be produced by the mechanical method are the bromides of iron, sodium, ammonium, calcium and magnesium.

Especially suitable hydrogen sulphates and sulphates which are contained in solutions from which salt aerosols can be produced by the mechanical method are the hydrogen sulphates and sulphate of iron, sodium, ammonium, iron ammonium, alum and magnesium.

The especially suitable carbonic acid which is contained in some solutions and from which salt aerosols can be produced by the mechanical method is the oxalic acid. Its salts and complexes with iron and its salts with sodium and ammonium are suitable as aerosol components.

It has been found that the aerosol particles especially then have an optimal effect as formers for highly reflective long-lasting clouds and also have a high degree of efficiency in the degradation of tropospheric methane, when the ice formation of the concentrated aqueous solution of the aerosol particles occurs only at temperatures which lie as far below 0° C. as possible. It has been found that these advantageous properties of the aerosol particles can then be achieved when:

the aerosol particles are especially hygroscopic and the atomized salt solution has a pH value between 4.5 and pH 0.

The preferred proportions of the elements iron, chlorine, sulphur, oxalate-carbon, silicon and bromine, without consideration of water content and other components in the composition of the released aerosols and also independent of whether they originated from the gas or vapour phase or from the mechanical nebulisation, are as follows:

| | |
|---|---|
| iron | equal to or larger than 5%, |
| chlorine + sulphur + oxalate-carbon + silicon | equal to or smaller than 90%, |
| bromine | equal to or smaller than 5%. |

Exemplary formulations are disclosed in the following which comply with these requirements and from which aqueous solutions or suspensions can be produced which are suitable for the formation of aerosols which have been generated by mechanical atomization:

Exemplary Formulation 1:

| | |
|---|---|
| iron(III)chloride | 1 parts by weight |
| iron(III)bromide | 0.01 parts by weight |
| ammonium oxalate | 0.1 parts by weight |

Exemplary Formulation 2:

| | |
|---|---|
| iron(II)chloride | 1 parts by weight |
| iron(II)bromide | 0.01 parts by weight |
| ammonium oxalate | 0.05 parts by weight |

Exemplary Formulation 3:

| | |
|---|---|
| sea salt | 1 parts by weight |
| iron(III)sulfate | 0.1 parts by weight |
| ammonium oxalate | 0.05 parts by weight |

Exemplary Formulation 4:

| | |
|---|---|
| sea salt | 1 parts by weight |
| iron(III)nitrate | 0.1 parts by weight |
| ammonium oxalate | 0.05 parts by weight |

Exemplary Formulation 5:

| | |
|---|---|
| sea salt | 1 parts by weight |
| iron(II)sulfate | 0.1 parts by weight |
| hydrogen chloride | 0.01 parts by weight |
| ammonium oxalate | 0.05 parts by weight |

Exemplary Formulation 6:

| | |
|---|---|
| sea salt | 1 parts by weight |
| iron(III)ammonium sulfate | 0.1 parts by weight |
| hydrogen chloride | 0.01 parts by weight |
| ammonium oxalate | 0.05 parts by weight |

Exemplary Formulation 7:

| | |
|---|---|
| sea salt | 1 parts by weight |
| iron sulfide | 0.2 parts by weight |
| hydrogen chloride | 0.01 parts by weight |
| ammonium oxalate | 0.1 parts by weight |

Exemplary Formulation 8:

| | |
|---|---|
| sea salt | 1 parts by weight |
| iron oxide hydrate | 0.2 parts by weight |
| elementary sulfur | 0.1 parts by weight |

-continued

| hydrogen chloride | 0.01 parts by weight |
| ammonium oxalate | 0.1 parts by weight |

Exemplary Formulation 9:

| sea salt | 1 parts by weight |
| iron(III)chloride | 0.2 parts by weight |
| elementary sulfur | 0.1 parts by weight |
| gelform silicic acid calculated as SiO2 | 0.2 parts by weight |
| oxalic acid | 0.1 parts by weight |

Formulations according to Examples 1 and 2 are preferred for the emission of the aerosols in accordance with the invention with carrier gas streams from ground based emission installations, preferably by way of the emission sources of warm smoke gases and warm waste air and waste gas streams. The transport gases used preferably contain sulphur dioxide which is quickly absorbed upon contact with the aerosol in accordance with the invention and the oxygen from air as sulfate and hydrogen sulfate. Above urban regions in which such emission installations are located sufficient sulphur dioxide is present in many cases in order to achieve the enrichment of the aerosol in accordance with the invention with especially preferred hydrogen sulfate. The formation of hydrogen sulfate causes the desired hygroscopic behavior of the aerosols even when the loss of its halogenide components due to photochemical oxidation on the iron salt to liquid halogenide radicals is completed and they therefore themselves do not contain any further hygroscopic salt components, as for example in the formulation according to Example 2. The iron(III)salts contained in the formulation according to Example 1 are already inherently hygroscopic.

The formulations according to Examples 1 and 2 are preferred for the emission of the aerosols in accordance with the invention with transport gas streams from flying emission facilities, preferably by way of the waste gas emission sources of the jet turbines of commercial airliners. These transport gases also include sulphur dioxide, the content of which in transport gas can be simply increased by elevation of the sulphur content in the kerosene fuel. The salt aerosol in accordance with the invention can thereby be enriched with hydrogen sulfate to such an extent that the salt aerosol obtains advantageous hygroscopic properties.

The aerosols emitted from stationary structures in the ocean or from traveling ships are preferably produced by nebulisation of sea water to which only iron and/or carboxylate is added in addition to its natural salt content which is at 3.5% and less. The formulations 3 to 5 are examples thereof. However, the addition of sulphur dioxide is also advantageous in order to largely suppress the hydrolysis of the trivalent iron salts to iron(III)oxide hydrate.

The formulations 8 and 9 are examples of suspensions from which the salt aerosols in accordance with the invention can be formed.

The aerosols produced from gases or vapors are exclusively produced from gaseous or evaporated salt precursors. With the exception of the solution of silicon tetrabromide in silicon tetrachloride, these compounds are preferably not evaporated from the common solution because of the low mutual solubility of silicon tetrachloride and iron(III)chloride and because of the chemical reaction with solids precipitation between the silicon tetrachloride and oxalic acid or formic acid. Oxalylchloride, formylchloride, silicon tetrachloride, and silicon tetrabromide are characterized by sufficient mutual solubility so that these compounds also can be evaporated from a common solution.

By way of the reduction of the tropospheric methane and $CO_2$ levels due to the iron content in the volcanic ash of the Pinatubo eruption of 1991, namely iron chloride, iron bromide and iron sulfate, the magnitude of the rate of decomposition of the greenhouse gases by iron salt aerosols can be roughly estimated: By taking into consideration the essentially higher reactivity of the pure iron salt aerosols produced in accordance with the invention compared to natural volcanic ash with its lower iron salt content, the - compared to the salt aerosol produced in accordance with the invention—many times longer residence time in the atmosphere compared to the comparatively porous volcanic ash and the small-bubble glass structure which is relatively non-transparent to sunlight because of the dark accompanying minerals and its large inner surface, the specific methane decomposition due to the iron halogenide aerosol produced in accordance with the invention is many times higher than that of volcanic ash. According to this calculation, one kg iron in the iron halogenide aerosols is able to decompose about 10 t methane and 60 t carbon dioxide by photolytic induced oxidation and stimulation of the phytoplankton multiplication.

The annual global greenhouse gas mass which enters the atmosphere due to human activities is at about 25,000,000,000 t/a CO2-equivalence. The economically easily producible global annual emission of 100,000 t iron as iron halogenide aerosol worldwide is according to this calculation sufficient for decomposition of this greenhouse gas mass in order to eliminate the GWP effect of the anthropogenic emitted greenhouse gases.

In this conservative calculation, further cooling effects have not been taken into consideration which arise from the decomposition of the further greenhouse factors:

removal of the tropospheric levels of ozone, soot and carbon dioxide by chemical reaction with the bromine, chlorine, and iron emissions in accordance with the invention, increase of the global sunlight reflection physically triggered by the bromine, chlorine, and iron emissions in accordance with the invention.

It is therefore to be expected that the annual mass load required to reverse the heating trend of the troposphere is substantially smaller than 100,000 t/a iron as iron salt aerosols.

The amount of time during which the active element-containing halogenide aerosol is to be maintained in the troposphere in accordance with the invention and/or the required annual halogenide aerosol mass load can be assessed according to different measures. One possibility for assessment is the completion of the removal of a predetermined mass of at least one greenhouse gas from the group of methane, carbon dioxide, carbon monoxide, ozone, by the active element-containing salt aerosol. This assessment lends itself to the compensation and generation of so-called greenhouse gas emission certificates based on the process in accordance with the invention.

Another possibility for the assessment of the active element-containing aerosol mass to be emitted is the concerted and direct fulfilment of global climate goals. The process of the invention is preferably carried out in several facilities for the production and emission of the halogenide aerosol and/or its predecessor substances. These facilities are initially operated for an indeterminate amount of time. Preferably, the iron load which is emitted with the iron containing salt aerosols produced in these facilities is initially preset for the time period of two years at a sum of 100,000 t/year. Within this two year time frame, while the emission of the aerosol into the troposphere is carried out, the course of the tropospheric and oceanic climate related parameters is followed with the already present global measuring stations:

- reduction, stagnation, slowed increase, or undampened increase of the annual average temperature (troposphere),
- reduction, stagnation, slowed increase, or undampened increase of the methane content (troposphere),
- reduction or stagnation of the carbon dioxide content (troposphere),
- reduction, stagnation, slowed or undampened increase of the carbon monoxide content (troposphere),
- reduction, stagnation, slowed or undampened increase of the content of dark carbon particles (soot and humic matter type carbon-rich aerosols) (troposphere),
- reduction or stagnation of the ozone content (troposphere),
- increase in or stagnation of the chlorine level (troposphere),
- increase in or stagnation of the bromine active element level (troposphere),
- increase in or stagnation of the iron active element level (troposphere),
- increase in or stagnation of the global cloud reflection as a result of constant or increasing cloud cover (troposphere),
- increase in or stagnation of the global cloud reflection as a result of constant or increasing specific cloud reflection (troposphere),
- increase in or stagnation of the chlorophyll content in the world's seas (oceans).

These parameters serve the control of the composition of the troposphere and at the same time the adjustment of the constantly globally to be emitted iron load after the 2 year time limit during which the iron load was limited to 100,000 t/year. If the methane and CO2 contents stagnate, the iron load of 100,000 t/year can be maintained for the following two year time interval. If the methane and CO2 contents are declining, the iron load, depending on the steepness of the decline, is reduced to a value between 50,000 and 90,000 t/year for the following 2 year interval. If the methane and CO2 contents remain on the increase, the iron load, depending on the steepness of the increase, is raised to a value between 250,000 and 400,000 t/year for the following 2 year interval.

One proceeds in this manner until the values of the annually emitted iron load and the climate parameters have settled at a generally accepted equilibrium condition.

Since the methane driven greenhouse gas potential is more effectively reduced with the process in accordance with the invention than the carbon dioxide greenhouse gas potential, it is advantageous to decompose carbon dioxide, in addition and in parallel to the process in accordance with the invention, with one or more of the known processes with sustained effect such as the Terra-Preta process.

It is especially advantageous to combine the already patented process for the combustion technology based production of iron oxide aerosols for the purpose of cooling of the troposphere according to the PCT publications with the International Publication No. WO 03/013698 A2, WO 2008/006364 and the German published Application 10 2009 004 281 A1 with the process which is the subject of the present patent application.

An advantageous application of the process in accordance with the invention is possible in offshore wind power facilities. The excess electrical energy which occurs during extended wind fields or generally over night in offshore wind power installations can be used for sea water electrolysis. The resulting electrolytically formed bromine-containing chlorine gases can then be directly emitted into the troposphere. They act especially in cooperation with the troposphere iron salt aerosols of the process of the invention in the troposphere to reduce methane and decompose ozone.

It is, however, especially advantageous to transform the active elements as quickly as possible in the troposphere, or even better still within the carrier gas stream, into the preferred form of the hygroscopic salt aerosols, since then the decomposition of the greenhouse gases can occur simultaneously with the formation of the reflecting clouds. It is therefore preferred to use the halogens generated electrolytically or according to the other known chemical processes directly for the formulation of iron-, and halogen-containing gases and to then emit them into the troposphere. This occurs according to the generally known process of the iron(III) chloride formation from chlorine and heated metallic iron and/or the silicon tetrachloride production from chlorine and heated elementary silicon. These processes are highly exothermal so that iron(III)chloride and silicon tetrachloride can be produced in gaseous form without further heat input and can then be added individually or together to the carrier gas.

The invention claimed is:

1. Process for cooling of the troposphere comprising the steps of:
   producing a gaseous or vaporous halogen-containing substance, wherein said gaseous or vaporous halogen-containing substance includes at least the elements chlorine and bromine in the form of a salt or salt solution and is characterized by at least one of the following properties:
   gaseous at 20° C.,
   vaporous below 500° C.,
   measurable vapor pressure, when temperature is above 50° C.,
   hygroscopic,
   hydrolyzable
   and wherein said gaseous or vaporous halogen-containing substance is produced not by using a combustion using oxygen or a halogen hydrocarbon as an oxidant, but by using one of the following methods:
   (a) electrolysis of a salt-water solution, or
   (b) mechanical fumigation of a salt solution having a pH value between pH 4.5 and pH 0, wherein the thereby produced halogen-containing substance has the following proportions of the elements iron, chlorine, bromine, sulphur, oxalate, carbon, and silicon:
   iron equal to or larger than 5%,
   chlorine+sulphur+oxalate+carbon+silicon equal to or smaller than 90%, and
   bromine equal to or smaller than 5%
   adding an aerosol to the troposphere, which includes at least an iron-containing substance and at least said halogen-containing substance,
   wherein the troposphere is artificially enriched by adding said aerosol in an amount that corresponds globally to an iron-load of 100,000 T (ton) per year or less, and
   wherein the aerosol includes, apart from the elements iron and halogens, at least one further element selected from the group consisting of silicon, carbon, sulphur, and nitrogen, wherein the halogen-containing substance is selected from the group consisting of: $FeCl_3$, $FeCl_3 \times 6\ H_2O$, $FeBr_3$, $FeBr_3 \times 6\ H_2O$, $SiCl_4$, $SiBr_4$, $Br_2$, $Cl_2$, $BrCl$, $S_2Cl_2$, $SCl_2$, $S_2Br_2$, $SBr_2$, $HBr_2$, $HCl$, $NH_4Cl$, $NH_4Br$, oxalylchloride and oxalylbromide, wherein said aerosol includes at least one substance selected from the group consisting of: iron(II)salts, chloride free iron(III)salts, iron chalcogenides and mixtures of iron salts, iron salt solutions and iron chalcogenide suspensions with sea salt and sea water.

2. Process according to claim 1, wherein the addition of the halogen-containing substance to the troposphere is carried out in a carrier gas and/or the halogen-containing substance is formed in the free troposphere.

3. Process according to claim 2, wherein the addition of said aerosol to the troposphere is carried out by release of the vaporous and/or gaseous halogen-containing substance and the iron-containing substance at least at one location and at the same time and in one carrier gas stream in each case, whereby the carrier gas stream is guided through a containment or the carrier gas stream freely moves through the atmosphere or the carrier gas and the location of introduction of the halogen-containing substance and the iron-containing substance into the carrier gas move relative to each other, and wherein the respective carrier gas, after take-up of the halogen-containing substance and the iron-containing substance, is released into the troposphere.

4. Process according to claim 2, wherein the addition of said aerosol to the troposphere is carried out by introduction of the vaporous and/or gaseous halogen-containing substance and the iron-containing substance at least at two separate locations and/or at different times in one carrier gas stream in each case, whereby the respective carrier gas stream is guided through a containment at the respective location of introduction or the respective carrier gas stream freely moves through the atmosphere or the respective carrier gas stream and the respective location of introduction of the halogen-containing substance and the iron-containing substance into the carrier gas move relative to each other, and wherein the respective carrier gas, after take-up of the halogen-containing substance and the iron-containing substance, is released into the troposphere.

5. Process according to claim 2, wherein the iron-containing substance is added to the carrier gas in the form of an aerosol.

6. Process according to claim 2, wherein an exhaust gas stream and/or an air stream of an aircraft or a watercraft, or wind at rotor blades or a tower of wind turbines is use as the carrier gas.

7. Process according to claim 1, wherein the halogens and inter-halogen compositions formed by salt water electrolysis are directly emitted into the troposphere.

8. Process for cooling of the troposphere comprising the steps of:

producing a gaseous or vaporous halogen-containing substance, wherein said gaseous or vaporous halogen-containing substance includes at least the elements chlorine and bromine in the form of a salt or salt solution and is characterized by at least one of the following properties:

gaseous at 20° C., vaporous below 500° C., measurable vapor pressure, when temperature is above 50° C., hygroscopic, hydrolyzable and wherein said gaseous or vaporous halogen-containing substance is produced not by using a combustion using oxygen or a halogen hydrocarbon as an oxidant, but by using the following methods:

exothermic chemical reaction of the halogens chlorine and/or bromine with at least one substance selected from the group consisting of:

metallic iron, metallic titanium, elementary silicon, iron-silicon alloys, iron-titanium alloys, silicon-titanium alloys, elementary sulphur, and iron-sulphur compounds, especially iron (II) sulfide, which are all heated, before they are brought into contact with chlorine and bromine in elementary form adding the product of said reaction to the troposphere, which includes at least an iron-containing substance and at least said halogen-containing substance, wherein the troposphere is artificially enriched by adding said aerosol in an amount that corresponds globally to an iron-load of 100,000 T (ton) per year or less, and wherein the aerosol includes, apart from the elements iron and halogens, at least one further element selected from the group consisting of silicon, carbon, sulphur, and nitrogen, wherein the halogen-containing substance is selected from the group consisting of: $FeCl_3$, $FeCl_3 \times 6\ H_2O$, $FeBr_3$, $FeBr_3 \times 6\ H_2O$, $SiCl_4$, $SiBr_4$, $Br_2$, $Cl_2$, $BrCl$, $S_2Cl_2$, $SCl_2$, $S_2Br_2$, $SBr_2$, $HBr_2$, $HCl$, $NH_4Cl$, $NH_4Br$, oxalylchloride and oxalylbromide, wherein said aerosol includes at least one substance selected from the group consisting of: iron(II)salts, chloride free iron(III)salts, iron chalcogenides and mixtures of iron salts, iron salt solutions and iron chalcogenide suspensions with sea salt and sea water.

9. Process according to claim 8, wherein the addition of the halogen-containing substance to the troposphere is carried out in a carrier gas and/or the halogen-containing substance is formed in the free troposphere.

10. Process according to claim 9, wherein the addition of said aerosol to the troposphere is carried out by release of the vaporous and/or gaseous halogen-containing substance and the iron-containing substance at least at one location and at the same time and in one carrier gas stream in each case, whereby the carrier gas stream is guided through a containment or the carrier gas stream freely moves through the atmosphere or the carrier gas and the location of introduction of the halogen-containing substance and the iron-containing substance into the carrier gas move relative to each other, and wherein the respective carrier gas, after take-up of the halogen-containing substance and the iron-containing substance, is released into the troposphere.

11. Process according to claim 9, wherein the addition of said aerosol to the troposphere is carried out by introduction of the vaporous and/or gaseous halogen-containing substance and the iron-containing substance at least at two separate locations and/or at different times in one carrier gas stream in each case, whereby

- the respective carrier gas stream is guided through a containment at the respective location of introduction or
- the respective carrier gas stream freely moves through the atmosphere or
- the respective carrier gas stream and the respective location of introduction of the halogen-containing substance and the iron-containing substance into the carrier gas move relative to each other, and wherein the respective carrier gas, after take-up of the halogen-containing substance and the iron-containing substance, is released into the troposphere.

12. Process according to claim 9, wherein the iron-containing substance is added to the carrier gas in the form of an aerosol.

13. Process according to claim 9, wherein an exhaust gas stream and/or an air stream of an aircraft or a watercraft, or wind at rotor blades or a tower of wind turbines is use as the carrier gas.

14. Process according to claim 8, wherein the halogens and inter-halogen compositions formed by salt water electrolysis are directly emitted into the troposphere.

* * * * *